(12) United States Patent
Bohn et al.

(10) Patent No.: US 8,773,849 B2
(45) Date of Patent: Jul. 8, 2014

(54) EXTENDABLE CONNECTING LINK

(75) Inventors: David D. Bohn, Fort Collins, CO (US); Paul M. O'Brien, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/084,284

(22) Filed: Apr. 11, 2011

(65) Prior Publication Data

US 2012/0257368 A1    Oct. 11, 2012

(51) Int. Cl.

| H05K 7/02 | (2006.01) |
|---|---|
| H05K 7/04 | (2006.01) |
| G06F 1/16 | (2006.01) |
| H05K 5/00 | (2006.01) |
| H05K 7/00 | (2006.01) |
| H04M 1/00 | (2006.01) |

(52) U.S. Cl.
USPC .............. 361/679.28; 361/809; 361/679.27; 455/575.1; 455/575.3; 455/575.4

(58) Field of Classification Search
USPC ............ 361/809, 679.27, 679.28; 455/575.3, 455/575.4, 575.1
See application file for complete search history.

(56) References Cited

U.S. PATENT DOCUMENTS

| 4,050,116 A | 9/1977 | Salice |
|---|---|---|
| 4,949,426 A | 8/1990 | Komaki |
| 5,052,078 A | 10/1991 | Hosoi |
| 5,077,551 A | 12/1991 | Saitou |
| 5,268,816 A | 12/1993 | Abell, Jr. et al. |
| 5,335,142 A | 8/1994 | Anderson |
| 5,390,075 A | 2/1995 | English et al. |
| 5,394,297 A | 2/1995 | Toedter |
| 5,581,440 A | 12/1996 | Toedter |
| 5,661,797 A | 8/1997 | Leman et al. |
| 5,827,082 A | 10/1998 | Laine |
| 6,108,868 A | 8/2000 | Lin |
| 6,223,393 B1 | 5/2001 | Knopf |
| 6,230,365 B1 | 5/2001 | Lu |
| 6,252,767 B1 | 6/2001 | Carlson |
| 6,359,776 B2 | 3/2002 | Carlson |

(Continued)

FOREIGN PATENT DOCUMENTS

JP    06310874    11/1994

OTHER PUBLICATIONS

"Fpc (Mobile Phone Flex Cable)", Retrieved from: <http://richli.en.made-in-china.com/product/FeBEzQgvHJic/China-Fpc-Mobile-Phone-Flex-Cable-.html>on Oct. 11, 2010, (2010),1 page.

(Continued)

*Primary Examiner* — Anthony Haughton
*Assistant Examiner* — Zhengfu Feng
(74) *Attorney, Agent, or Firm* — Judy Yee; Micky Minhas (57) ABSTRACT

In embodiments of an extendable connecting link, a first link section attaches in a first housing part of a device and a second link section attaches in a second housing part of the device. The first and second link sections interlock and slide-engage relative to each other. An interconnection channel routes an electrical interconnection between the first housing part and the second housing part of the device, where the interconnection channel is formed when the first and second link sections are slide-engaged. The first and second link sections also slide relative to each other to increase or decrease a length of the extendable connecting link.

20 Claims, 8 Drawing Sheets

(56) References Cited

U.S. PATENT DOCUMENTS

| | | | |
|---|---|---|---|
| 6,388,872 | B1 | 5/2002 | Liao et al. |
| 6,404,622 | B1 | 6/2002 | Chen |
| 6,553,625 | B2 | 4/2003 | Lin et al. |
| 6,692,275 | B2 | 2/2004 | Lee |
| 6,895,638 | B2 | 5/2005 | Lin |
| 7,054,147 | B2 | 5/2006 | Maatta et al. |
| 7,058,433 | B2 * | 6/2006 | Carpenter .................. 455/575.1 |
| 7,106,579 | B2 | 9/2006 | Maskatia et al. |
| 7,155,266 | B2 | 12/2006 | Stefansen |
| 7,155,780 | B2 | 1/2007 | Chen |
| 7,266,864 | B2 | 9/2007 | Kim |
| 7,299,523 | B2 * | 11/2007 | Zou ................................ 16/287 |
| 7,374,424 | B1 * | 5/2008 | Nurmi et al. .................... 439/31 |
| 7,414,834 | B2 | 8/2008 | Ukonaho et al. |
| 7,483,723 | B2 | 1/2009 | Soderlund |
| 7,484,271 | B2 | 2/2009 | Oshima et al. |
| 7,515,707 | B2 * | 4/2009 | Ka et al. .................. 379/433.12 |
| 7,522,944 | B2 * | 4/2009 | Hyun et al. ................. 455/575.1 |
| 7,596,832 | B2 | 10/2009 | Hsieh et al. |
| 7,640,044 | B2 * | 12/2009 | Won et al. .................. 455/575.3 |
| 7,688,970 | B2 | 3/2010 | Garcia et al. |
| 7,719,827 | B2 | 5/2010 | Mihara et al. |
| 7,729,720 | B2 | 6/2010 | Suh et al. |
| 7,738,930 | B2 | 6/2010 | Petrella |
| 7,787,912 | B2 | 8/2010 | Saila |
| 7,787,914 | B2 | 8/2010 | Ahn et al. |
| 7,898,815 | B2 | 3/2011 | Tanaka et al. |
| 7,925,309 | B2 | 4/2011 | Soderlund |
| 7,930,803 | B2 | 4/2011 | Ueyama et al. |
| 7,933,118 | B2 | 4/2011 | Chiu et al. |
| 7,970,442 | B2 * | 6/2011 | Chiang ....................... 455/575.1 |
| 7,974,085 | B2 | 7/2011 | Ouyang |
| 8,004,833 | B2 | 8/2011 | Tseng et al. |
| 8,104,144 | B2 | 1/2012 | Wang et al. |
| 8,208,249 | B2 | 6/2012 | Chin et al. |
| 8,289,688 | B2 | 10/2012 | Behar et al. |
| 8,441,791 | B2 | 5/2013 | Bohn et al. |
| 8,451,601 | B2 | 5/2013 | Bohn |
| 2001/0003707 | A1 * | 6/2001 | Moriya .......................... 455/566 |
| 2001/0009499 | A1 | 7/2001 | Carlson |
| 2002/0069483 | A1 | 6/2002 | Savolainen et al. |
| 2004/0077199 | A1 | 4/2004 | Winstead et al. |
| 2004/0209641 | A1 | 10/2004 | Hong |
| 2004/0212968 | A1 | 10/2004 | Lin |
| 2004/0246667 | A1 | 12/2004 | Maskatia et al. |
| 2005/0079900 | A1 | 4/2005 | Li |
| 2005/0239520 | A1 | 10/2005 | Stefansen |
| 2006/0080805 | A1 | 4/2006 | Takagi |
| 2006/0171529 | A1 | 8/2006 | Iikura |
| 2006/0185122 | A1 | 8/2006 | Saito et al. |
| 2006/0198513 | A1 | 9/2006 | Eldon |
| 2006/0246964 | A1 | 11/2006 | Castaneda et al. |
| 2007/0000088 | A1 | 1/2007 | Mao et al. |
| 2007/0054710 | A1 * | 3/2007 | Pan ............................ 455/575.3 |
| 2007/0107163 | A1 * | 5/2007 | Barnett ........................... 16/367 |
| 2008/0307608 | A1 | 12/2008 | Goto |
| 2009/0000062 | A1 | 1/2009 | Yamanami |
| 2009/0147458 | A1 | 6/2009 | Wang et al. |
| 2009/0151118 | A1 | 6/2009 | Karkkola et al. |
| 2009/0156260 | A1 | 6/2009 | Derengowski et al. |
| 2009/0227301 | A1 | 9/2009 | Lindvall |
| 2009/0265890 | A1 | 10/2009 | Endo et al. |
| 2009/0291719 | A1 | 11/2009 | Christensen |
| 2010/0071155 | A1 * | 3/2010 | Ueyama et al. ................. 16/250 |
| 2010/0088853 | A1 | 4/2010 | Degner et al. |
| 2010/0232096 | A1 | 9/2010 | Chen |
| 2010/0304799 | A1 | 12/2010 | Leung et al. |
| 2011/0102986 | A1 | 5/2011 | Asakura et al. |
| 2011/0265288 | A1 | 11/2011 | Chiang |
| 2012/0162866 | A1 | 6/2012 | Bohn |
| 2012/0194972 | A1 | 8/2012 | Bohn |
| 2012/0206864 | A1 | 8/2012 | Bohn |
| 2012/0206893 | A1 | 8/2012 | Bohn |

OTHER PUBLICATIONS

Falcone, Joe "Microminiature Connector Solutions for Wireless Handheld Devices", Retrieved from: <http://www.ecnmag.com/Products/2009/08/Microminiature-Connector-Solutions-for-Wireless-Handheld-Devices/> on Oct. 11, 2010, (Aug. 21, 2009),4 pages.

Ruhfass, Michelle "Review: Samsung's Double Jointed SCH-u740", Retrieved from: <http://www.mobileburn.com/review.jsp?Id=3188> on Oct. 27, 2010, (Mar. 1, 2007),2 pages.

Wattanajantra Asavin "Fujitsu dual-touchscreen concept phone will have you feeling double", Retrieved from: <http://crave.cnet.co.uk/mobiles/fujitsu-dual-touchscreen-concept-phone-will-have-you-feeling-double-50001064/> on Oct. 8, 2010 (Oct. 7, 2010),11 pages.

Kelander, et al., "Modeling for High-Speed Interconnects in Mobile Device Hinge Structures", Retrieved at <<http://ieeexplore.ieee.org/stamp/stamp.jsp?tp=&arnumber=4060770 >>, 1st Electronics Systemintegration Technology Conference, Sep. 5-7, 2006, pp. 485-490.

Bohn, et al., "Double Hinge Axial Cams", Filed Date: Jan. 31, 2011, Application No. 13/017460, pp. 1-17.

Bohn, et al., "Double Hinge Torsion Bar", Filed Date: Feb. 14, 2011, Application No. 13/027021, pp. 1-18.

Bohn, et al., "Double Hinge Radial Cams", Filed Date: Dec. 23, 2010, Application No. 12/978162, pp. 1-16.

Bohn, et al., "Hinge Electrical Interconnection Guide", Filed Date: Feb. 10, 2010, Application No. 13/024506, pp. 1-19.

"Notice of Allowance", U.S. Appl. No. 12/978,162, (Nov. 30, 2012), 12 pages.

"Notice of Allowance", U.S. Appl. No. 13/017,460, (Nov. 30, 2012), 14 pages.

"Restriction Requirement", U.S. Appl. No. 13/027,021, (Apr. 4, 2013), 7 pages.

"Non-Final Office Action", U.S. Appl. No. 13/024,506, (May 2, 2013), 8 pages.

"Non-Final Office Action", U.S. Appl. No. 13/027,021, (Jul. 2, 2013),11 pages.

"Final Office Action", U.S. Appl. No. 13/024,506, (Nov. 15, 2013), 7 pages.

"Final Office Action", U.S. Appl. No. 13/027,021, (Dec. 17, 2013), 8 pages.

"Foreign Office Action", CN Application No. 201210029063.0, Jan. 26, 2014, 11 Pages.

"Notice of Allowance", U.S. Appl. No. 13/027,021, Mar. 12, 2014, 6 pages.

"Non-Final Office Action", U.S. Appl. No. 13/024,506, Apr. 4, 2014, 8 pages.

* cited by examiner

EXTENDABLE CONNECTING LINK

BACKGROUND

Mobile consumer devices, such as cell phones, media players, and portable computers are increasingly common, and many include dual displays and/or a display device that opens and closes relative to a handheld base of a device. For example, a mobile computer device can be hinged to open two display devices, each integrated into a foldable device housing. However, conventional hinge mechanisms can include relatively complex rotating hinges and hardware components to position the display screens for use, and may not allow for dual displays to open side-by-side to form one larger display. The conventional hinge mechanisms can also be obtrusive when configured between display devices and/or may take up space that would otherwise be utilized to implement a larger display device. Users typically want the smallest possible devices to conveniently carry in a pocket or purse, but also want devices with larger display surfaces.

SUMMARY

This Summary introduces simplified concepts of an extendable connecting link, and the concepts are further described below in the Detailed Description and/or shown in the Figures. This Summary should not be considered to describe essential features of the claimed subject matter, nor used to determine or limit the scope of the claimed subject matter.

An extendable connecting link is described. In embodiments, an extendable connecting link includes a first link section that attaches in a first housing part of a device and a second link section that attaches in a second housing part of the device. The first and second link sections of the extendable connecting link interlock and slide-engage relative to each other. An interconnection channel routes an electrical interconnection between the first housing part and the second housing part of the device, where the interconnection channel is formed when the first and second link sections are slide-engaged. The electrical interconnection may include any one or combination of a flexible printed circuit, an electrical cable, an optical fiber, a coaxial cable, an antenna coaxial cable, or the flexible printed circuit bundled with any of the cables.

The first and second link sections of the extendable connecting link also slide relative to each other to increase or decrease a length of the extendable connecting link. For example, the first and second link sections can slide relative to each other to increase a length of the extendable connecting link when the first and second housing parts of the device are opened from a closed position at zero degrees (0°) to ninety degrees (90°), and when the first and second housing parts of the device are closed from an open position at one-hundred and eighty degrees (180°) back to ninety degrees (90°). Additionally, the first and second link sections can slide relative to each other to decrease a length of the extendable connecting link when the first and second housing parts of the device are closed from ninety degrees (90°) to the closed position at zero degrees (0°), and when the first and second housing parts of the device are opened from ninety degrees (90°) to the open position at one-hundred and eighty degrees (180°).

In other embodiments, the first and second housing parts of a device are movably coupled with a barrel hinge and with the first and second link sections of the extendable connecting link. A first cam is integrated with the first link section of the extendable connecting link, and a second cam is integrated with the second link section of the extendable connecting link. The first and second cams apply a torque to open and close the first and second housing parts of the device relative to each other. The first and second cams rotate to apply the torque as the first and second link sections of the extendable connecting link rotate relative to the first and second housing parts of the device. The first and second cams also apply a first detent when the first and second housing parts of the device are opened relative to each other, and apply a second detent when the first and second housing parts of the device are closed relative to each other.

In other embodiments, a portable device includes a first housing part that is integrated with a display device, and a second housing part that is movably coupled to the first housing part. The first and second housing parts are configurable from a closed position to an open position at approximately one-hundred and eighty degrees (180°). Optionally, the second housing part is integrated with an additional display device, and the two display devices are configurable adjacent each other as a surface display in the open position of the device. A hinge, such as a small barrel hinge, along with an extendable connecting link is operable to movably couple the first and second housing parts of the device. The extendable connecting link includes the first and second link sections that slide relative to each other to increase or decrease a length of the extendable connecting link.

BRIEF DESCRIPTION OF THE DRAWINGS

Embodiments of an extendable connecting link are described with reference to the following Figures. The same numbers may be used throughout to reference like features and components that are shown in the Figures.

DETAILED DESCRIPTION

An extendable connecting link is described that is designed to increase and decrease in length, while also rotating, when attached in a portable device that has housing parts that open and close relative to each other. For example, a portable device, such as a cell phone or portable computer device, may have a first housing part that is integrated with a display device, and also a second housing part that includes an integrated display device. An extendable connecting link movably couples the first and second housing parts of the portable device, and the two display devices are configurable adjacent each other as a surface display when the device is opened to approximately one-hundred and eighty degrees (180°). The extendable connecting link provides that the two display devices (or a display device and a keypad) can be positioned as close together as possible in the open position.

Additionally, the extendable connecting link includes an interconnection channel between the first and second housing parts of the portable device to route an electrical interconnection, such as any one or combination of a flexible printed circuit, an electrical cable, an optical fiber, a coaxial cable, an antenna coaxial cable, or the flexible printed circuit bundled with any of the cables. The extendable connecting link is installable under the display devices, and along with the electrical interconnection, can be hidden from view in the portable device.

While features and concepts of an extendable connecting link can be implemented in any number of different devices, systems, and/or configurations, embodiments of an extendable connecting link are described in the context of the following example devices, systems, and methods.

Figure 1:
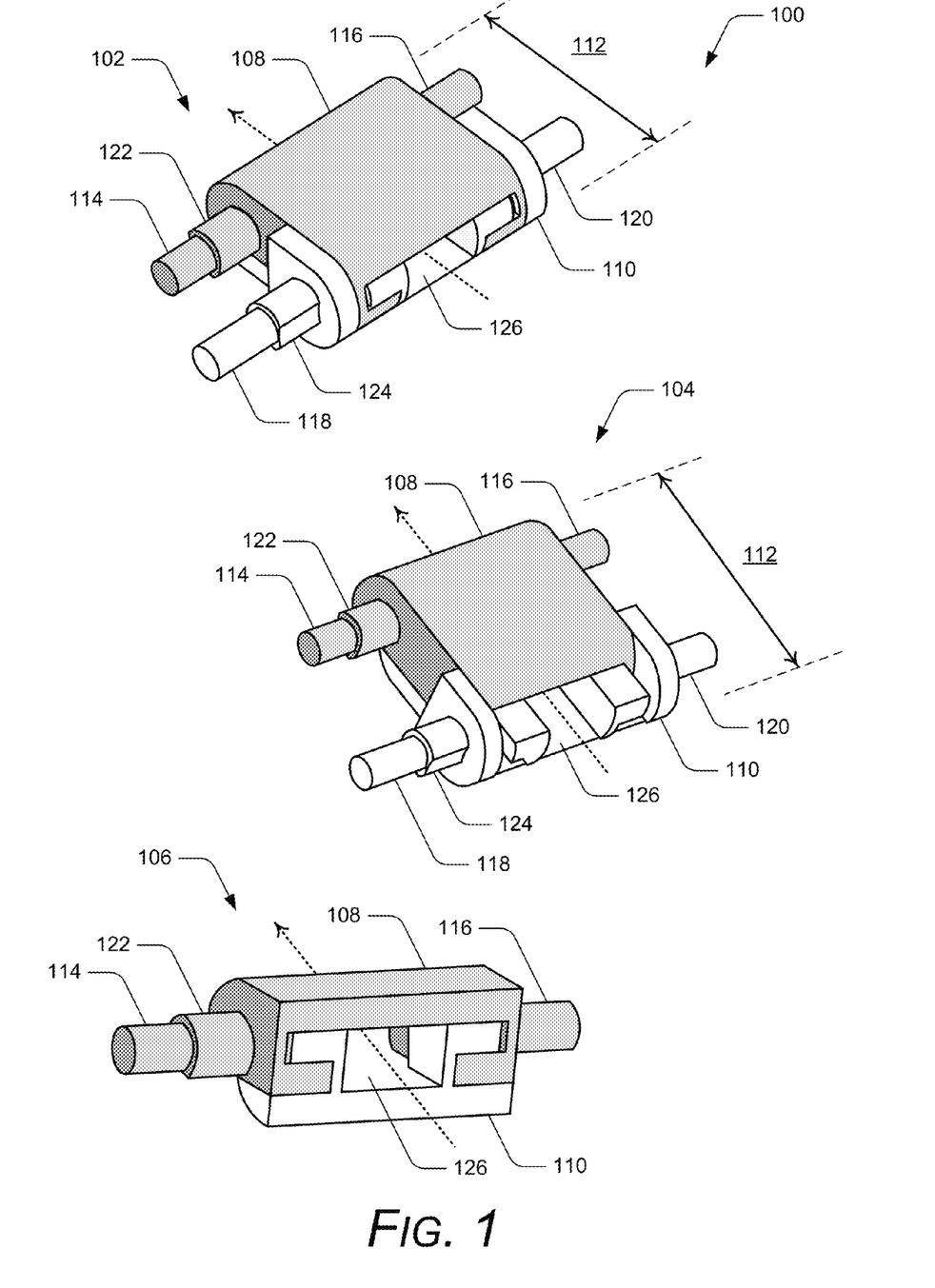
FIG. 1 illustrates an example of an extendable connecting link in accordance with one or more embodiments.

FIG. 1 illustrates an example of an extendable connecting link 100 in accordance with embodiments described herein. The extendable connecting link is shown non-extended at 102, extended at 104, and a cross-section of the extendable connecting link is shown at 106. The extendable connecting link has a first link section 108 and a second link section 110. The first and second link sections of the extendable connecting link interlock and slide-engage relative to each other to increase or decrease a length 112 of the extendable connecting link. The first link section includes pins 114, 116 that are designed to attach in a first housing part of a portable device, such as a cell phone or portable computer device. The second link section includes pins 118, 120 that are also designed to attach in a second housing part of the portable device.

One of the pins 114 of the first link section 108 includes a first integrated cam 122. Similarly, one of the pins 118 of the second link section 110 includes a second integrated cam 124. The first and second cams apply a torque to open and close first and second housing parts of a portable device relative to each other. The first and second cams rotate to apply the torque as the first and second link sections of the extendable connecting link rotate relative to the first and second housing parts of the portable device. The first and second cams also apply a first detent when the first and second housing parts of the portable device are opened relative to each other, and apply a second detent when the first and second housing parts of the portable device are closed relative to each other.

The first link section 108 and the second link section 110 of the extendable connecting link 100 can slide relative to each other to increase the length (e.g., shown extended at 104) of the extendable connecting link when the first and second housing parts of a portable device are opened from a closed position at zero degrees (0°) to ninety degrees (90°), and then when the first and second housing parts of the device are closed from an open position at one-hundred and eighty degrees (180°) back to ninety degrees (90°). Additionally, the first and second link sections can slide relative to each other to decrease the length of the extendable connecting link when the first and second housing parts of the portable device are closed from ninety degrees (90°) to the closed position at zero degrees (0°), and when the first and second housing parts of the portable device are opened from ninety degrees (90°) to the open position at one-hundred and eighty degrees (180°).

The extendable connecting link 100 also includes an interconnection channel 126 (e.g., shown in the cross-section at 106) that routes an electrical interconnection between the first housing part and the second housing part of a portable device. The interconnection channel is formed when the first link section 108 and second link section 110 are slide-engaged. An electrical interconnection may include any one or combination of a flexible printed circuit, an electrical cable, an optical fiber, a coaxial cable, an antenna coaxial cable, or the flexible printed circuit bundled with any of the cables routed between the first and second housing parts of a portable device.

Figure 2:
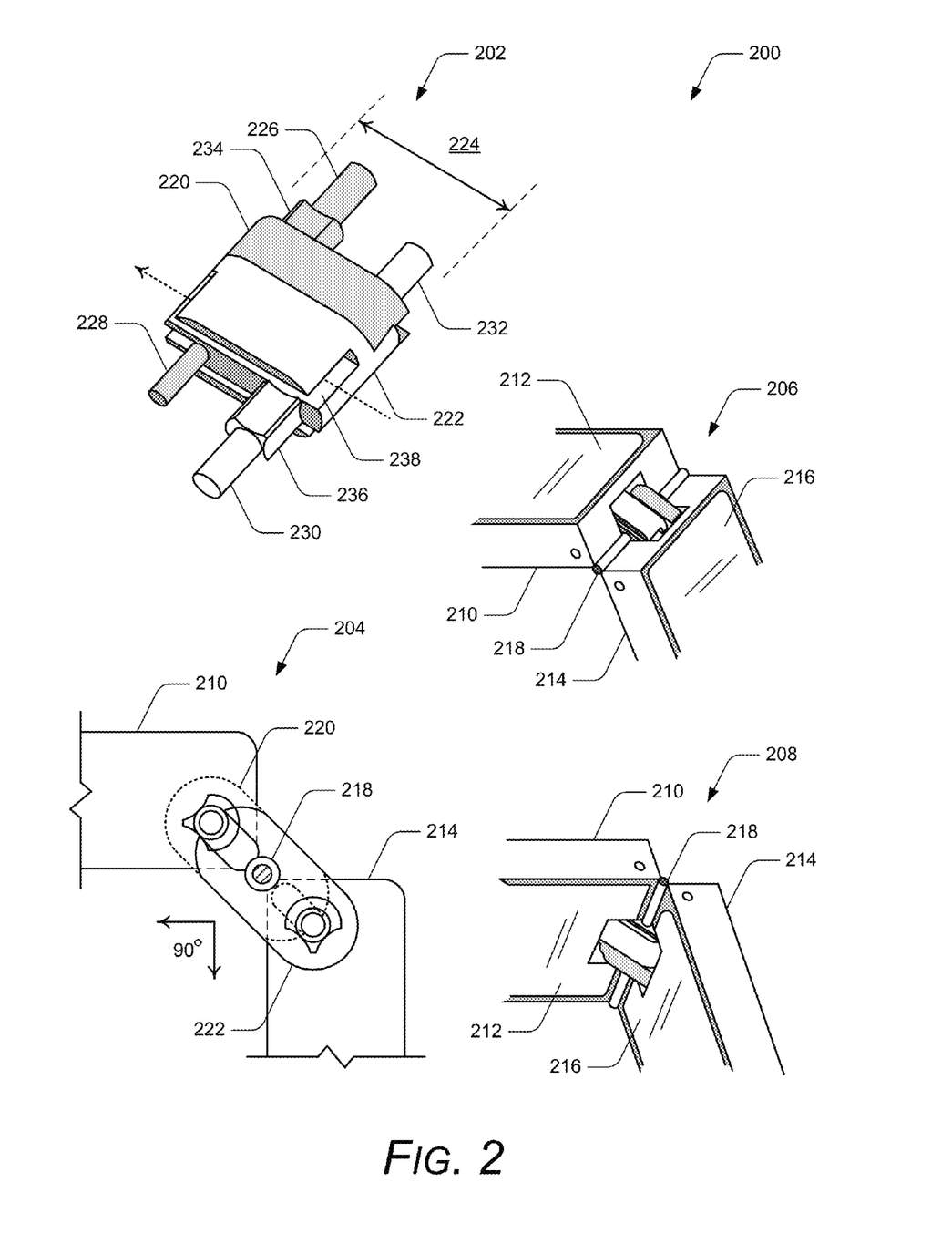
FIG. 2 illustrates another example of an extendable connecting link in accordance with one or more embodiments.

FIG. 2 illustrates another example of an extendable connecting link 200 in accordance with embodiments described herein. The extendable connecting link is shown non-extended at 202, and a cross-section of the extendable connecting link is shown extended at 204 (e.g., at approximately 90°). Additionally, the extendable connecting link is shown extended at 206 in a first view when the extendable connecting link is implemented in a portable device, and is also shown extended at 208 in a second view when implemented in the portable device.

Figure 8:
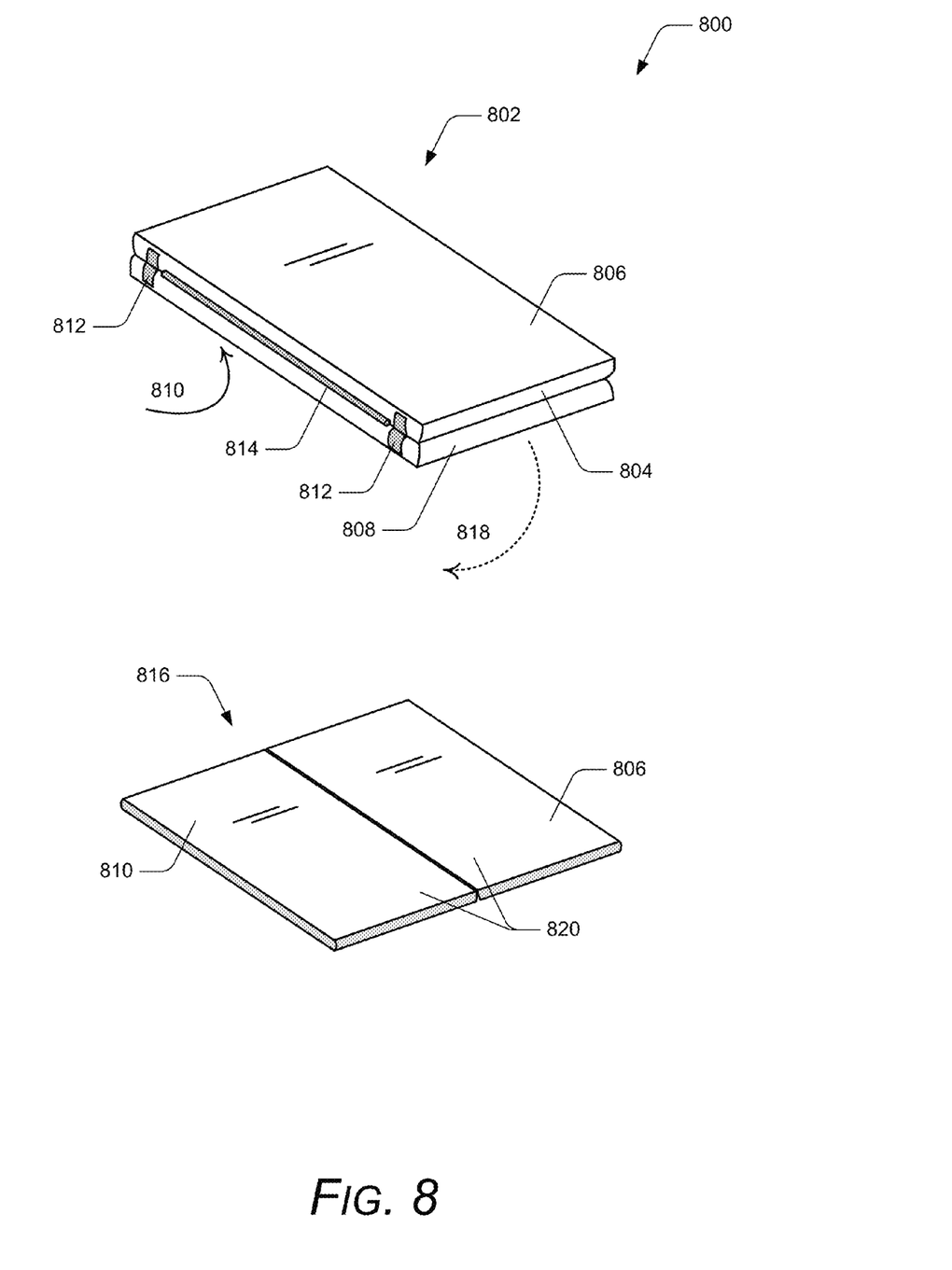
FIG. 8 illustrates an example of a portable device implemented with extendable connecting links in accordance with one or more embodiments.

The extendable connecting link 200 can be attached in a portable device, such as a cell phone or portable computer device, that has a first housing part 210 integrated with a display device 212, and has a second housing part 214 that is movably coupled to the first housing part. Optionally, the second housing part may also be integrated with an additional display device 216, and the two display devices are configurable adjacent each other as a surface display when the device is opened to one-hundred and eighty degrees (180°), an example of which is shown in FIG. 8. The display devices can be integrated into either side of the first and second housing parts of the portable device.

As shown in the extended second view at 208, the display devices can be implemented to face inwards when the portable device is closed (also referred to as a book mode). Although the extendable connecting link is shown in the extended second view at 208, the extendable connecting link is implemented in the first and second housing parts of the portable device and the display devices would cover over the extendable connecting link. Alternatively, as shown in the extended first view at 206, the display devices can be implemented to face outwards when the portable device is closed and the display devices are viewable from opposite sides of the portable device (also referred to as an anti-book mode).

In embodiments, a hinge 218, such as a small barrel hinge (also commonly referred to as a piano hinge), along with the extendable connecting link is operable to movably couple the first and second housing parts of the portable device. In this example, the housing parts of the portable device are movably coupled with the barrel hinge and the first and second link sections of the extendable connecting link. As an alternative to a barrel hinge, the hinge 218 may be implemented as any flexible connection of various materials that movably couples the housing parts of the portable device.

The extendable connecting link 200 has a first link section 220 and a second link section 222. The first and second link sections of the extendable connecting link interlock and slide-engage relative to each other to increase or decrease a length 224 of the extendable connecting link. The first link section includes pins 226, 228 that are designed to attach in the first housing part 210 of the portable device. The second link section includes pins 230, 232 that are also designed to attach in the second housing part 214 of the portable device.

One of the pins 226 of the first link section 220 includes a first integrated cam 234. Similarly, one of the pins 230 of the second link section 222 includes a second integrated cam 236. The extendable connecting link shown extended at 204 illustrates that the first link section has a U-shaped notch that engages a pin of the second link section. Similarly, the second link section has a U-shaped notch that engages pin of the first link section. The first and second cams apply a torque to open and close the first and second housing parts of the portable device relative to each other. The first and second cams rotate to apply the torque as the first and second link sections of the extendable connecting link rotate relative to the first and second housing parts of the portable device. The first and second cams also apply a first detent when the first and second housing parts of the portable device are opened relative to each other, and apply a second detent when the first and second housing parts of the portable device are closed relative to each other.

The first link section 220 and the second link section 222 of the extendable connecting link 200 can slide relative to each other to increase the length (e.g., shown extended at 204) of the extendable connecting link when the first and second housing parts of a portable device are opened from a closed position at zero degrees (0°) to ninety degrees (90°), and then when the first and second housing parts of the device are closed from an open position at one-hundred and eighty degrees (180°) back to ninety degrees (90°). Additionally, the first and second link sections can slide relative to each other to decrease the length of the extendable connecting link when the first and second housing parts of the portable device are closed from ninety degrees (90°) to the closed position at zero degrees (0°), and when the first and second housing parts of the portable device are opened from ninety degrees (90°) to the open position at one-hundred and eighty degrees (180°).

The extendable connecting link 200 also includes an interconnection channel 238 that routes an electrical interconnection between the first housing part 210 and the second housing part 214 of the portable device. In this example, the interconnection channel is formed in the second link section 222 that slide-engages the first link section 220. An electrical interconnection may include any one or combination of a flexible printed circuit, an electrical cable, an optical fiber, a coaxial cable, an antenna coaxial cable, or the flexible printed circuit bundled with any of the cables routed between the first and second housing parts of a portable device.

Figure 3:
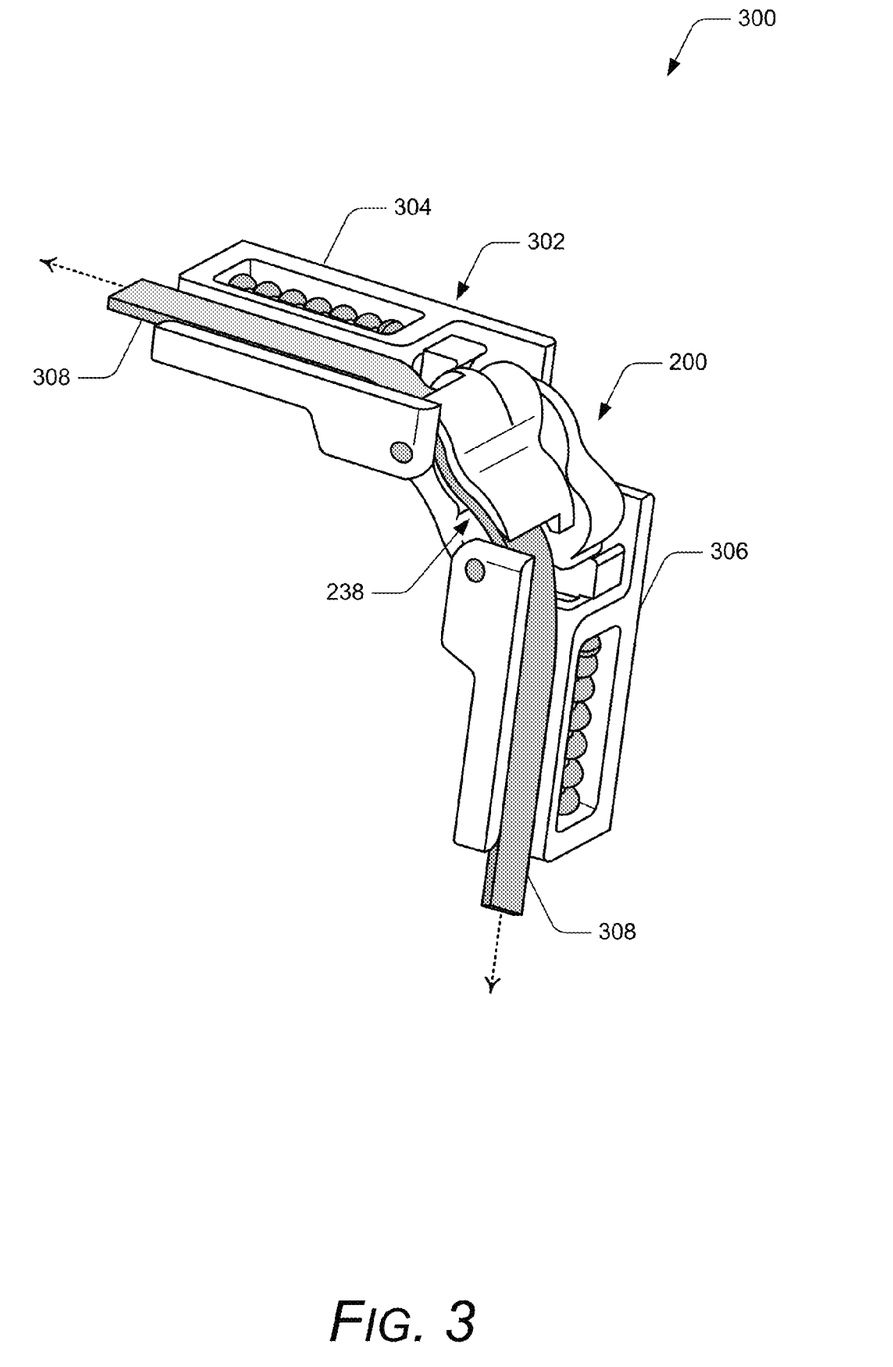
FIG. 3 further illustrates an example configuration of an extendable connecting link with an electrical interconnection in accordance with one or more embodiments.

FIG. 3 further illustrates an example configuration 300 of the extendable connecting link 200 shown in FIG. 2. The extendable connecting link is shown installed in a hinge chassis 302, and components described with reference to FIG. 2 are identified in FIG. 3. The hinge chassis has a first chassis half 304 and a second chassis half 306, both designed to attach to housing sections of a portable device. For example the first chassis half attaches to a first housing part of a portable device, and the second chassis half attaches to a second housing part of the portable device. The extendable connecting link is then operable to open and close the first and second housing parts of the portable device relative to each other.

In this example, the extendable connecting link 200 is shown extended, such as when the first and second housing parts of a portable device are positioned open at ninety degrees (90°). As described with reference to FIG. 2, the extendable connecting link includes the interconnection channel 238 that routes an electrical interconnection 308 between the first housing part and the second housing part of a portable device.

Figure 4:
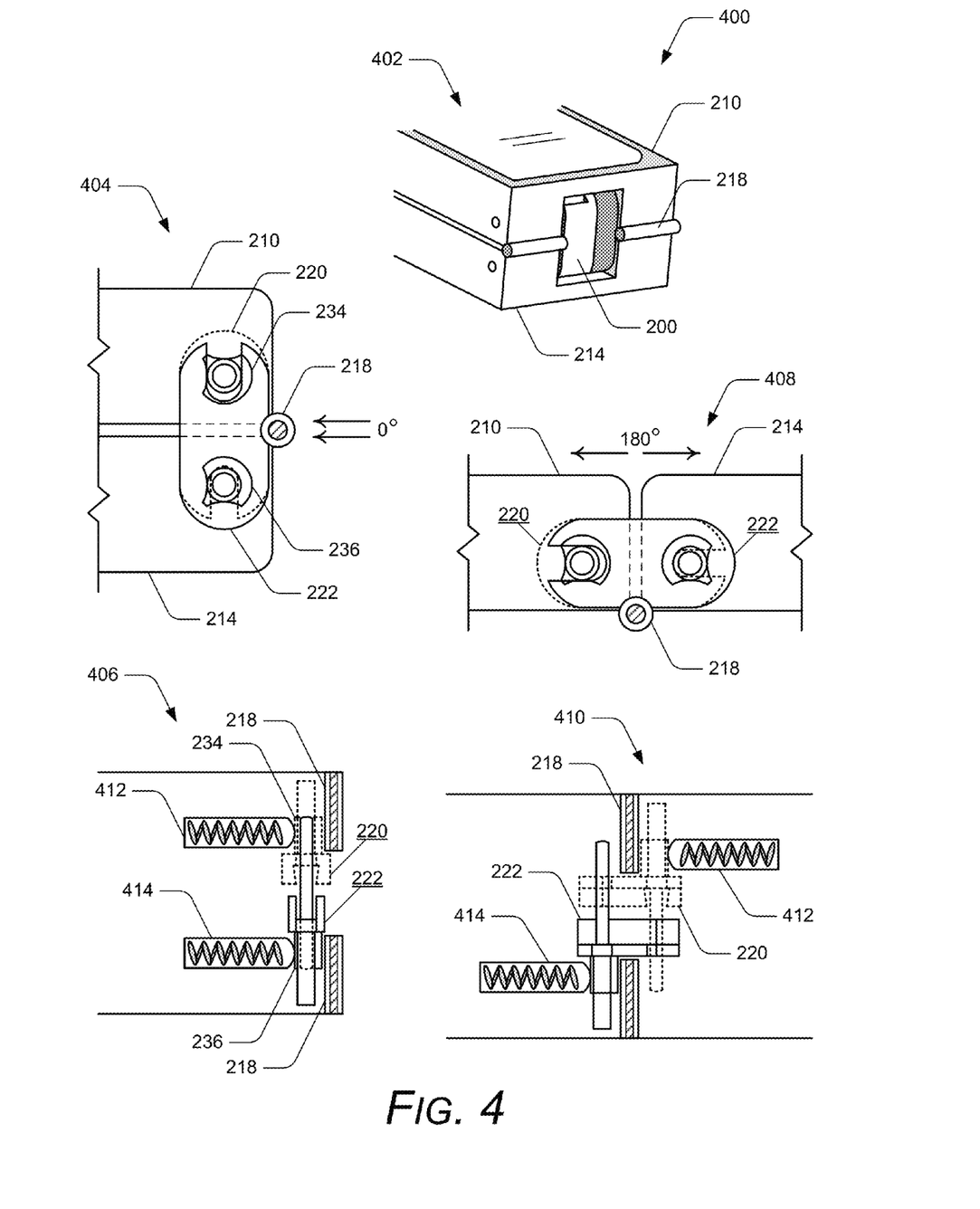
FIG. 4 further illustrates example configurations of an extendable connecting link in accordance with one or more embodiments.

FIG. 4 further illustrates example configurations 400 of the extendable connecting link 200 shown in FIGS. 2 and 3. The extendable connecting link is shown installed in a portable device and the device is shown in the closed position at 402. A cross-section of the extendable connecting link is shown non-extended when the portable device is in the closed position at 404 (e.g., at approximately 0°), and from a top view at 406. Additionally, the extendable connecting link is shown non-extended when the portable device is in an open position at 408 (e.g., at approximately 180°), and from a top view at 410. When the portable device is in the closed position or open at approximately one-hundred and eighty degrees (180°), the extendable connecting link is non-extended as shown at 404 and at 408.

As shown in the respective top views of the portable device in the closed position at 406 and in the open position at 410, the portable device includes a first cam-follower mechanism 412 with a spring to apply a force against the integrated cam 234 at the first link section 220 of the extendable connecting link. The portable device also includes a second cam-follower mechanism 414 with an additional spring to apply a force against the integrated cam 236 at the second link section 222 of the extendable connecting link. The integrated cams rotate as the first and second link sections of the extendable connecting link rotate relative to the first and second housing parts of the portable device. The cam-follower mechanisms apply the force to the integrated cams to implement a first detent when the portable device is opened, and to implement a second end-of-travel detent when the portable device is closed. In embodiments, the integrated cams and cam-follower mechanisms can be implemented as radial or axial cam mechanisms, and/or may be implemented for overcenter bistable motion.

Figure 5:
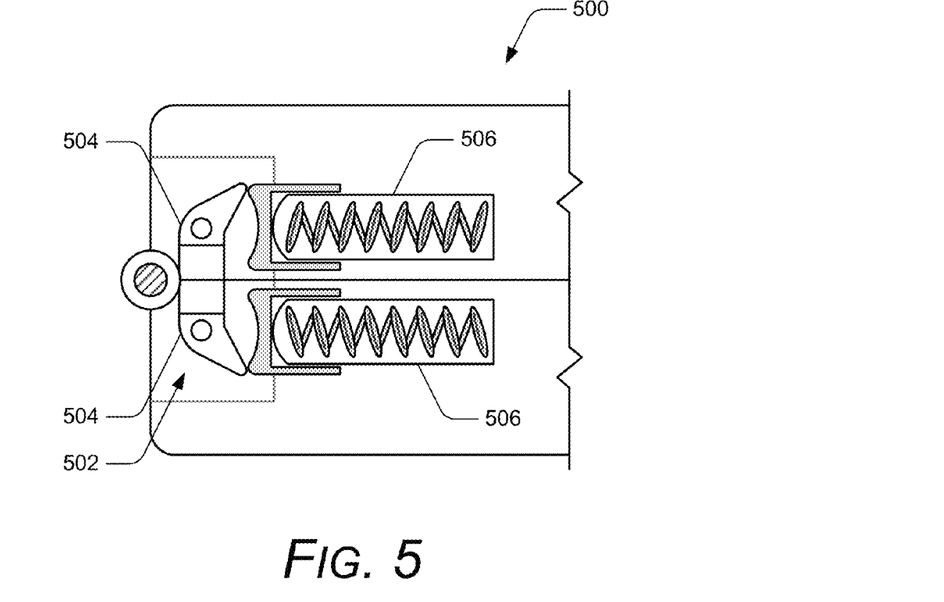
FIG. 5 illustrates an example configuration of an extendable connecting link with integrated cams and dual cam-follower mechanisms.

FIG. 5 illustrates an example configuration 500 of an extendable connecting link 502 with integrated cams 504 and dual cam-follower mechanisms 506. The cam-follower mechanisms each include a spring that applies a force against a respective integrated cam of a link section of the extendable connecting link. The cam-follower mechanisms apply the force to the integrated cams to implement a first detent when the portable device is opened, and to implement a second end-of-travel detent when the portable device is closed.

Figure 6:
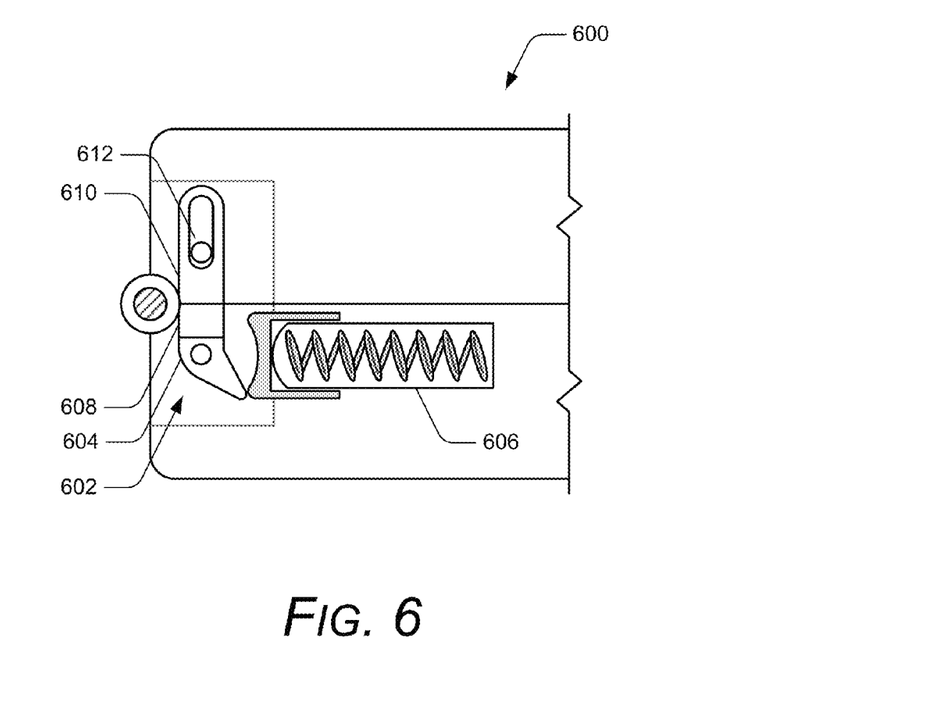
FIG. 6 illustrates an alternative example configuration of an extendable connecting link with a single integrated cam and cam-follower mechanism.

FIG. 6 illustrates an alternative example configuration 600 of an extendable connecting link 602 with a single integrated cam 604 and a cam-follower mechanism 606. The cam-follower mechanism includes a spring that applies a force against the integrated cam of a first link section 608 of the extendable connecting link. The second link section 610 of the extendable connecting link includes an expansion slot 612 that accommodates the first and second housing parts of a portable device opening and closing relative to each other with the torque applied from the single integrated cam and cam-follower mechanism. The cam-follower mechanism applies the force to the integrated cam to implement a first detent when the portable device is opened, and to implement a second end-of-travel detent when the portable device is closed.

Figure 7:
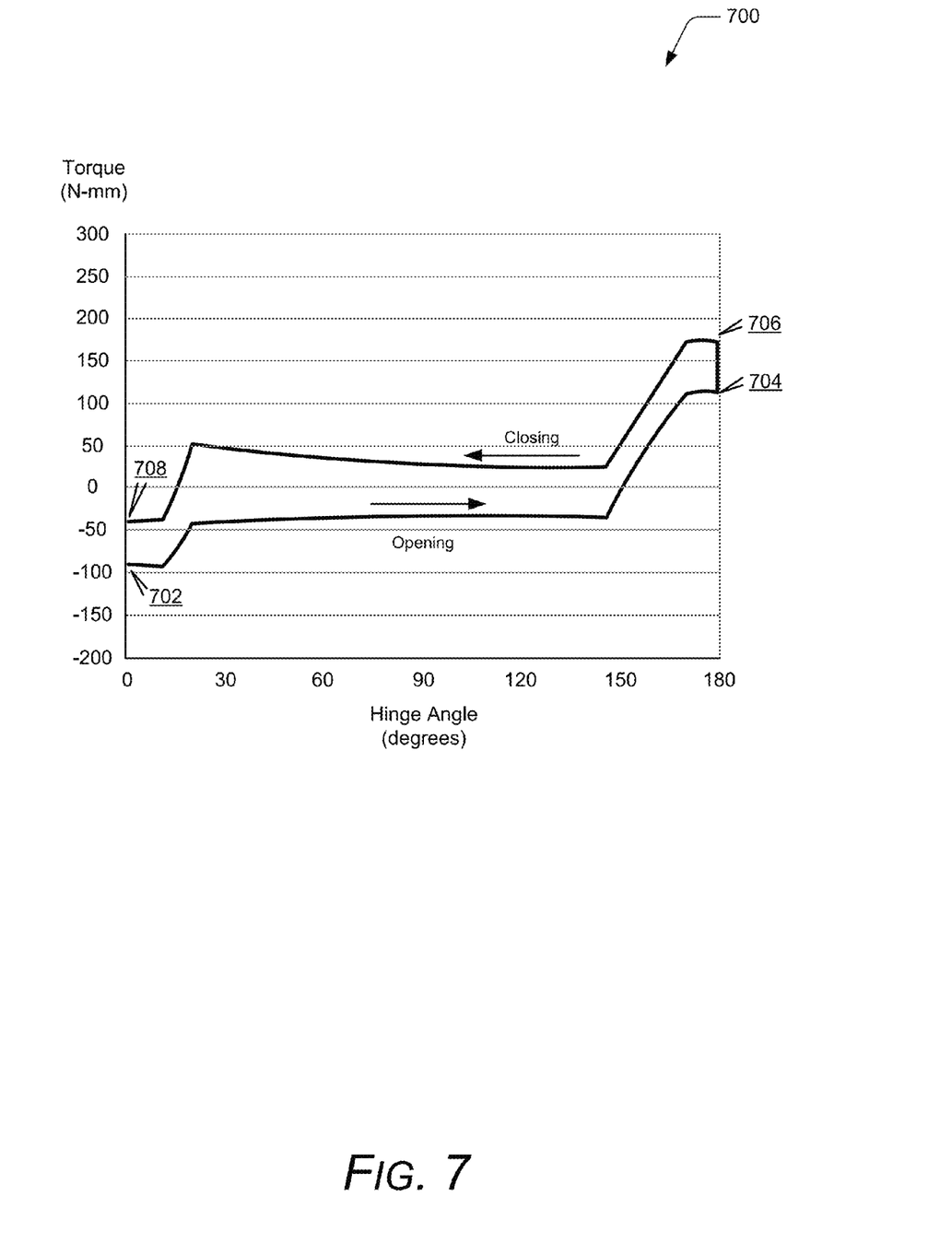
FIG. 7 illustrates a torque chart for an extendable connecting link in accordance with one or more embodiments.

FIG. 7 illustrates a torque chart 700 for an extendable connecting link in accordance with embodiments described herein. The torque chart illustrates the torque (in Newton-millimeters) as the extendable connecting link is opened from a closed position at zero degrees (0°) to an open position at a hinge angle of one-hundred and eighty degrees (180°), and then back to the closed position at the hinge angle of zero degrees (0°). The portable device begins in the closed position at 702 (hinge angle 0°), and a force is applied to begin opening the first and second housing parts of the portable device relative to each other. Between approximately twenty degrees (20°) and one-hundred and fifty degrees (150°), the integrated cams are designed to provide a smooth, consistent open torque, and then the device opens by itself to a first, end-of-travel detent at 704 (hinge angle 180°).

In the open position at 704, the integrated cams of the extendable connecting link apply the holding torque that resists the first and second housing parts closing responsive to a touch input to a display device implemented as a touch-screen display. When a force is again applied (torque between 704 and 706), the first and second housing parts begin reverse-sequence closing relative to each other. Between approximately one-hundred and fifty degrees (150°) and twenty degrees (20°), the integrated cams provide a smooth, consistent close torque, and then the device closes by itself to a second, end-of-travel detent at 708 (hinge angle 0°).

FIG. 8 illustrates examples of a portable device 800 that can be implemented to include extendable connecting links in accordance with embodiments described herein. In embodiments, the portable device may be any form of a consumer, computer, user, communication, phone, navigation, television, appliance, gaming, media playback, and/or electronic device. In a first view 802, the portable device 800 is shown in a closed position. The portable device 800 has a first housing part 804 with an integrated display device 806, and also has a second housing part 808 that may include a physical keyboard or an additional display device 810 (e.g., on the underside of the portable device as shown in this example). Correspondingly, the display devices are viewable from opposite sides of the portable device in the closed position of the first and second housing parts (also referred to as the anti-book mode).

The first housing part 804 is movably coupled to the second housing part 808 by extendable connecting links 812, installed in the device between the display devices and operable to open from the closed position at approximately zero degrees (0°) to an open position at approximately one-hundred and eighty degrees (180°). In this example, the first housing part 804 is also movably coupled to the second housing part 808 with a hinge 814, such as a barrel hinge (also referred to as a piano hinge). In a second view 816, the portable device 800 is shown in the open position, such as when the second housing part 808 is rotated around and up at 818 to position the display device 806 and the additional display device 810 adjacent each other to form a surface display 820 (e.g., the two display devices appear as one larger display surface). In the open position, the extendable connecting links are not visible, and are designed to allow the display devices coming together in the open position.

Figure 9:
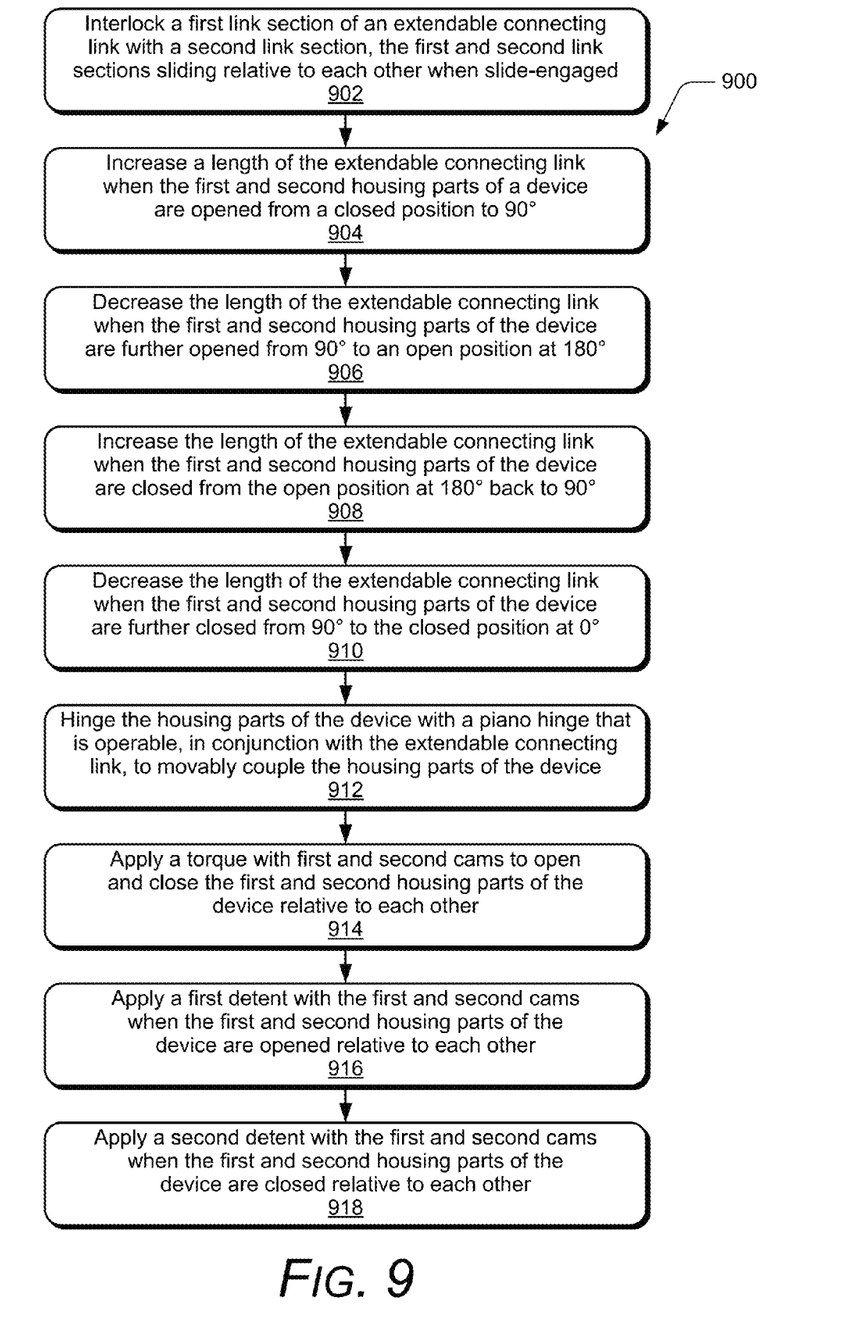
FIG. 9 illustrates example method(s) of an extendable connecting link in accordance with one or more embodiments.

FIG. 9 illustrates example method(s) 900 of an extendable connecting link. The order in which the method blocks are described are not intended to be construed as a limitation, and any number of the described method blocks can be combined in any order to implement a method, or an alternate method.

At block 902, a first link section of an extendable connecting link is interlocked with a second link section of the extendable connecting link, the first and second link sections sliding relative to each other when slide-engaged. For example, the first link section 108 of the extendable connecting link 100 (FIG. 1) is interlocked with the second link section 110, and the first and second link sections slide-engage relative to each other. The first link section includes pins 114, 116 that are designed for attachment in a first housing part of a portable device, and the second link section includes pins 118, 120 that are also designed for attachment in a second housing part of the portable device. Similarly, the first link section 220 of the extendable connecting link 200 (FIG. 2) is interlocked with the second link section 222, and the first and second link sections slide-engage relative to each other.

At block 904, a length of the extendable connecting link is increased when the first and second housing parts of a device are opened from a closed position at zero degrees (0°) to ninety degrees (90°). For example, the length 224 of the extendable connecting link 200 increases when the first and the second housing parts of the portable device are opened from the closed position as shown at 404 (FIG. 4) to approximately ninety degrees (90°) as shown at 204 (FIG. 2).

At block 906, the length of the extendable connecting link is decreased when the first and second housing parts of the device are further opened from ninety degrees (90°) to an open position at one-hundred and eighty degrees (180°). For example, the length 224 of the extendable connecting link 200 decreases when the first and the second housing parts of the portable device are further opened from ninety degrees (90°) as shown at 204 to approximately one-hundred and eighty degrees (180°) as shown at 408.

At block 908, the length of the extendable connecting link is increased when the first and second housing parts of the device are closed from the open position at one-hundred and eighty degrees (180°) back to ninety degrees (90°). For example, the length 224 of the extendable connecting link 200 increases when the first and second housing parts of the portable device are closed from the open position of one-hundred and eighty degrees (180°) as shown at 408 back to ninety degrees (90°) as shown at 204.

At block 910, the length of the extendable connecting link is decreased when the first and second housing parts of the device are further closed from ninety degrees (90°) to the closed position at zero degrees (0°). For example, the length 224 of the extendable connecting link 200 decreases when the first and the second housing parts of the portable device are further closed from ninety degrees (90°) as shown at 204 back to closed position at zero degrees (0°) as shown at 404.

At block 912, the first and second housing parts of the device are hinged with a barrel hinge that is operable, in conjunction with the extendable connecting link, to movably couple the first and second housing parts of the device.

For example, the barrel hinge 218, along with the extendable connecting link 200, movably couples the first and second housing parts of the portable device that open and close relative to each other.

At block 914, a torque is applied with first and second cams to open and close the first and second housing parts of the device relative to each other. For example, the first integrated cam 234 and the second integrated cam 236 apply the torque to open and close the first and second housing parts of the portable device relative to each other. The first link section 220 of the extendable connecting link 200 includes the first integrated cam 234 and the second link section 222 of the extendable connecting link includes the second integrated cam 236. Additionally, the first and second cams rotate to apply the torque as the first and second link sections of the extendable connecting link rotate relative to the first and second housing parts of the device.

At block 916, a first detent is applied with the first and second cams when the first and second housing parts of the device are opened relative to each other. At block 918, a second detent is applied with the first and second cams when the first and second housing parts of the device are closed relative to each other. For example, the first integrated cam 234 and the second integrated cam 236 are designed to implement a first detent when the first and second housing parts of the portable device are opened relative to each other, and are designed to implement a second detent when the first and second housing parts of the portable device are closed relative to each other.

Although embodiments of an extendable connecting link have been described in language specific to features and/or methods, the subject of the appended claims is not necessarily limited to the specific features or methods described. Rather, the specific features and methods are disclosed as example implementations of an extendable connecting link.

The invention claimed is:

1. An extendable connecting link, comprising:
   a first link section including a first pair of pins configured for attachment in a first housing part of a device, the first pair of pins extending along first respective long axes;
   a second link section including a second pair of pins configured for attachment in a second housing part of the device, the second pair of pins extending along second respective long axes, the first and second link sections interlocking and configured to slide-engage relative to each other, the first and second link sections further configured to slide relative to each other to increase a length of the extendable connecting link when the first and second housing parts of the device are rotated to open from a closed position and when the first and second housing parts of the device are rotated to close from an open position; and
   an interconnection channel configured to route an electrical interconnection between the first housing part and the second housing part of the device, the interconnection channel formed when the first and second link sections are slide-engaged, the interconnection channel extending generally orthogonally to both the first and second long axes of the first and second pair of pins.

2. An extendable connecting link as recited in claim 1, wherein the first and second link sections are configured to slide relative to each other to increase or decrease the length of the extendable connecting link.

3. An extendable connecting link as recited in claim 1, wherein the first and second link sections are configured to slide relative to each other to increase the length of the extendable connecting link when the first and second housing parts of the device are rotated to open from the closed position at zero degrees (0°) to ninety degrees (90°), and when the first and second housing parts of the device are rotated to close from the open position at one-hundred and eighty degrees (180°) to said ninety degrees (90°).

4. An extendable connecting link as recited in claim 1, wherein the first and second link sections are configured to slide relative to each other to decrease the length of the extendable connecting link when the first and second housing parts of the device are rotated to close from ninety degrees (90°) to the closed position at zero degrees (0°), and when the first and second housing parts of the device are rotated to open from said ninety degrees (90°) to the open position at one-hundred and eighty degrees (180°).

5. An extendable connecting link as recited in claim 1, wherein the first and second housing parts of the device are movably coupled with a barrel hinge and the first and second link sections of the extendable connecting link.

6. An extendable connecting link as recited in claim 1, wherein the interconnection channel is configured to route the electrical interconnection comprising at least one of a flexible printed circuit, an electrical cable, an optical fiber, a coaxial cable, an antenna coaxial cable, or the flexible printed circuit bundled with one or more cables.

7. An extendable connecting link as recited in claim 1, further comprising a first cam integrated with the first link section and a second cam integrated with the second link section, the first and second cams configured to apply a torque to open and close the first and second housing parts of the device relative to each other.

8. An extendable connecting link as recited in claim 7, wherein the first and second cams rotate to apply the torque as the first and second link sections of the extendable connecting link rotate relative to the first and second housing parts of the device.

9. An extendable connecting link as recited in claim 7, wherein the first and second cams are configured to apply a first detent when the first and second housing parts of the device are opened relative to each other, and apply a second detent when the first and second housing parts of the device are closed relative to each other.

10. A portable device, comprising:
    a first housing part integrated with a display device;
    a second housing part movably coupled to the first housing part, which is operable to open and close relative to the second housing part, the first and second housing parts configurable from a closed position to an open position at approximately one-hundred and eighty degrees (180°);
    a hinge operable to movably couple the first and second housing parts of the portable device; and
    an extendable connecting link operable to movably couple the first and second housing parts, the extendable connecting link comprising first and second link sections that slide relative to each other to increase or decrease a length of the extendable connecting link when the first and second housing parts are rotated to open and close relative to each other, the first link section including a first pair of pins extending along first respective long axes, the second link section including a second pair of pins extending along second respective long axes, the first and second link sections forming an interconnection channel configured to accommodate electrical interconnection structure, the interconnection channel extending generally orthogonally to both the first and second long axes of the first and second pair of pins.

11. A portable device as recited in claim 10, wherein the second housing part is integrated with an additional display device, and wherein the display device and the additional display device are configurable adjacent to each other as a surface display in the open position.

12. A portable device as recited in claim 10, wherein the first and second link sections of the extendable connecting link are configured to slide relative to each other to increase the length of the extendable connecting link when the first and second housing parts of the portable device are rotated to open from the closed position at zero degrees (0°) to ninety degrees (90°), and when the first and second housing parts of the portable device are rotated to close from the open position at one-hundred and eighty degrees (180°) to said ninety degrees (90°).

13. A portable device as recited in claim 10, wherein the first and second link sections of the extendable connecting link are configured to slide relative to each other to decrease the length of the extendable connecting link when the first and second housing parts of the portable device are rotated to close from ninety degrees (90°) to the closed position at zero degrees (0°), and when the first and second housing parts of the portable device are rotated to open from said ninety degrees (90°) to the open position at one-hundred and eighty degrees (180°).

14. A portable device as recited in claim 10, wherein the interconnection channel is configured to route the electrical interconnection structure between the first and second housing parts of the portable device, the interconnection channel formed when the first and second link sections of the extendable connecting link are interlocked and slide-engage relative to each other, and wherein the electrical interconnection structure comprises at least one of a flexible printed circuit, an electrical cable, an optical fiber, a coaxial cable, an antenna coaxial cable, or the flexible printed circuit bundled with one or more cables.

15. A portable device as recited in claim 10, wherein the extendable connecting link includes a first cam integrated with the first link section and a second cam integrated with the second link section, the first and second cams configured to apply a torque to open and close the first and second housing parts of the portable device relative to each other.

16. A portable device as recited in claim 15, wherein the first and second cams rotate to apply the torque as the first and second link sections of the extendable connecting link rotate relative to the first and second housing parts of the portable device.

17. A portable device as recited in claim 15, wherein the first and second cams are configured to apply a first detent when the first and second housing parts of the device are opened relative to each other, and apply a second detent when the first and second housing parts of the portable device are closed relative to each other.

18. A method, comprising:
   interlocking a first link section of an extendable connecting link including a first pair of pins extending along first respective long axes with a second link section of the extendable connecting link including a second pair of pins extending along second respective long axes, the first and second link sections sliding relative to each other when slide-engaged, the first link section configured for attachment in a first housing part of a device and the second link section configured for attachment in a second housing part of the device, the first and second link sections forming an interconnection channel extending generally orthogonally to both the first and second long axes of the first and second pair of pins and configured to accommodate electrical interconnection structure; and one of:

increasing a length of the extendable connecting link when the first and second housing parts of the device are rotated to open from a closed position at zero degrees (0°) to ninety degrees (90°), and when the first and second housing parts of the device are rotated to close from an open position at one-hundred and eighty degrees (180°) to said ninety degrees (90°); or decreasing the length of the extendable connecting link when the first and second housing parts of the device are rotated to close from ninety degrees (90°) to the closed position at zero degrees (0°), and when the first and second housing parts of the device are rotated to open from said ninety degrees (90°) to the open position at one-hundred and eighty degrees (180°).

19. A method as recited in claim 18, further comprising hinging the first and second housing parts of the device with a barrel hinge that is operable, in conjunction with the extendable connecting link, to movably couple the first and second housing parts of the device.

20. A method as recited in claim 18, further comprising:
   applying a torque with first and second cams to open and close the first and second housing parts of the device relative to each other, the first link section of the extendable connecting link including the first cam and the second link section of the extendable connecting link including the second cam;
   rotating the first and second cams to apply the torque as the first and second link sections of the extendable connecting link rotate relative to the first and second housing parts of the device;
   applying a first detent with the first and second cams when the first and second housing parts of the device are opened relative to each other; and
   applying a second detent with the first and second cams when the first and second housing parts of the device are closed relative to each other.

* * * * *